Figure 1:
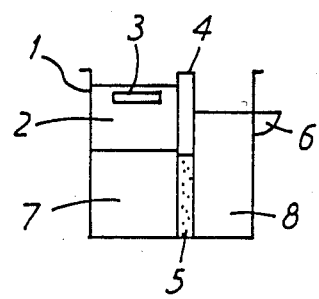

United States Patent [19]
Gesing et al.

[11] Patent Number: 4,790,873
[45] Date of Patent: Dec. 13, 1988

[54] REMOVING INCLUSIONS FROM MOLTEN METAL

[75] Inventors: Adam J. Gesing, Kingston; Martin R. Reeve, Beaconsfield; Ghyslain Dube, Jonquiere, all of Canada

[73] Assignee: Alcan International Limited, Montreal, Canada

[21] Appl. No.: 941,515

[22] Filed: Dec. 12, 1986

[30] Foreign Application Priority Data

Aug. 16, 1983 [GB] United Kingdom ............... 8322020
Aug. 16, 1983 [GB] United Kingdom ............... 8322021

[51] Int. Cl.$^4$ .............................................. C22B 9/02
[52] U.S. Cl. ................................... 75/68 R; 75/93 R; 75/93 A; 75/93 AC
[58] Field of Search .................. 75/68 R, 93 R, 93 A, 75/93 AC

[56] References Cited
U.S. PATENT DOCUMENTS 4,067,731 1/1977 Chia ..................................... 75/68 R
4,277,280 7/1981 Montgrain ........................... 75/68 R
4,395,333 7/1983 Groteke .............................. 75/68 R

FOREIGN PATENT DOCUMENTS 0068782 1/1983 European Pat. Off. .

*Primary Examiner*—Melvyn J. Andrews
*Attorney, Agent, or Firm*—Cooper & Dunham

[57] ABSTRACT

The invention provides a method of removing inclusions from molten metal, particularly aluminum, by
(a) contacting the molten metal with a medium which retains metal-non-wettable inclusions. The medium may be liquid such as a fused salt mixture; or solid such as a filter or metal-non-wettable ceramic materials or a bed of granules e.g. of tabular alumina,
(b) passing the molten metal through a filter of metal-wettable material, e.g. a refractory hard metal such as titanium diboride. The metal-wettable filter attracts and holds metal wettable inclusions within itself, and may also prevent by surface tension the entry of fused salt droplets.

13 Claims, 5 Drawing Sheets

REMOVING INCLUSIONS FROM MOLTEN METAL

This is a continuation of application Ser. No. 640,038, filed Aug. 10, 1984, now abandoned.

This invention relates to treatment of molten metals, particularly aluminium and alloys containing a major proportion of aluminium (hereinafter referred to as "Al") for removal of inclusions, particularly non-metallic inclusions. The method is particularly suitable for effecting such removal by in-line treatment of molten Al flowing in a transfer trough. In its most preferred form it is intended for treatment of Al flowing in such a trough from a furnace to a casting station to remove inclusions immediately before casting e.g. ingots for further working. The invention is particularly useful where low evolution of fume during such treatment is sought.

British Patent Specification No. 935191 describes a method of removing suspended oxides from molten Al by pouring a stream of the molten metal into a molten salt mixture which is capable of wetting, coalescing and retaining the suspended metal oxides and effecting intimate contact between the metal stream and the molten flux. Suitable molten salt mixtures for the treatment of Al are well known in the art, for example 5 to 20 weight % NaF or cryolite in a 50:50 mixture of NaCl and KCl. The method was effective in removing non-metallic inclusions such as suspended aluminium oxide from molten Al. However, it was found that complete separation of treated molten metal from molten salt was not obtained, such that the metal exiting from the treatment unit contained a suspension of fine salt particles. These were even more deleterious to the casting operation and cast metal quality than the inclusions originally present. Viscous salt particles clogged nozzles of casting machines, obstructing metal flow and resulted in ingots being "lost" during casting. Fine salt inclusions in the cast metal resulted in impaired working, mechanical and corrosion properties. As a result, this method of treatment is no longer used commercially.

British Patent Specification No. 1266500 describes a two-step method for removing non-metallic inclusions from molten metal. The first step involves flowing the metal through a multiplicity of flux-lined channels, desirably provided by a bed or layer of coarse refractory granules coated with a molten salt mixture. The patent acknowledges that, while this step is effective in removing non-metallic inclusions, it is less so in removing intermetallic particles. So the second step involves flowing the metal through a bed of uncoated refractory granules, whereby the intermetallic particles settle out in the interstices. The granules are preferably of alumina, but various other refractory materials are suggested, all of which are non-wetted by Al.

This bed of uncoated refractory granules is initially effective to entrap and retain molten salt particles, but there are serious disadvantages in use. The filter tends to clog as viscous salt particles accmulate, while channels are formed which reduce the effectiveness of retention. Moreover, intermetallic particles are not securely held by the filter and are liable to be flushed through by a subsequent surge of molten metal.

Some producers simply pass molten Al through a bed of refractory granules. These are effective to filter out non-wetted inclusions, but suffer from some quite severe disadvantages. Since refractory granules are used which are not wetted by Al, the interstices have to be quite large and/or the applied pressure has to be quite high in order to achieve an adequate flow of molten metal. Metal-wetted inclusions may be trapped in the interstices of the bed, but have no affinity for the filter medium, and are liable to be flushed through by a subsequent surge of molten metal.

There are commercially available filters formed of ceramic foams. These also are non-wetted by Al and suffer from the disadvantages noted in the previous paragraph.

Our European Patent Specification No. 68782 A2 describes an electrolytic reduction cell for Al including a metal-wettable filter located in the molten metal pool on the floor of the cell. The filter uses the surface tension forces existing between the metal—to prevent passage of suspended droplets of electrolyte. For this purpose, the apertures in the filter are made smaller than the electrolyte droplets. Provided that the pressure difference across the filter is kept below a maximum figure, which varies inversely with the size of the apertures, electrolyte droplets are retained upstream of the filter and do not enter it at all. The European specification is not concerned with removal of metal-wettable inclusions, which are indeed not present in molten metal within the reduction cell.

The present invention provides a method of removing inclusions from molten metal which method comprises (a) contacting the molten metal with a medium which retains metal-non-wettable inclusions, characterized by also (b) passing the molten metal through a filter of metal-wettable material, steps (a) and (b) being performed in sequence in either order.

While the method is applicable in principle to metals generally, it is particularly valuable in the treatment of aluminium (Al) and alloys thereof. The major non-metallic inclusions normally found in liquid Al include $Al_4C_3$, $TiB_2$, (Ti-V)B, MgO and $Al_2O_3$. Metallographic analysis shows that these compounds have a strong tendency to form aggregates or clusters. These clusters can be constituted either of a single specie (e.g. $TiB_2$) or of a mixed type (e.g. $Al_4C_3$-$TiB_2$).

Some of the inclusions, e.g. $TiB_2$ and (Ti-V)B, are easily wetted by Al. Others, e.g. $Al_2O_3$, and $Al_4C_3$, are not. It is observed that the inclusions which are wetted have a stronger tendency for agglomeration. Borides may be added as grain refiners in the form of particles of up to 2 microns and may form clusters of up to 30 microns. Oxide inclusions may have particle sizes ranging up to 100 microns. There appears to be a tendency for the larger non-wetted oxide particles to become coated with the smaller wetted boride particles, forming mixed clusters which are readily wetted by Al.

The key to the method is the use of a filter of metal-wettable material. Filters of this kind are described in European Patent Specification No. 68782 A2 as noted above. But for use in the method of this invention, the metal-wettable filter may need to perform a different function than, and to differ structurally from, the known filters, as described in more detail below.

The nature of the medium which retains metal-non-wettable inclusions, as used in step (a), is not critical. One possible medium is a molten flux as described in the British Patent Specification No. 935191 noted above; or a bed of refractory granules coated with molten flux as described in the British Patent Specification No. 1266500 noted above. Another possible medium is a solid filter or bed of metal-non-wettable material as presently used commercially. With the proviso that the last stage of the filtration should involve a solid, rather than a liquid, filter medium, various combinations are possible as exemplified by two embodiments:

(i) In step (a) the molten metal is contacted with a molten salt mixture which is capable of wetting and retaining inclusions, and in step (b), which is performed after step (a), the molten metal is passed through a metal-wettable filter having apertures sized to prevent the passage of molten salt droplets.

(ii) In step (a) the molten metal is passed through a filter of solid non-metal-wettable material.

These two embodiments of the invention will each be described in turn.

In embodiment (i), the molten metal is contacted in step (a) with a molten salt mixture which efficiently wets and retains non-metal-wettable inclusions, and less efficiently retains metal-wettable inclusions. The metal stream entering step (b) contains molten salt droplets and also some metal-wettable inclusions. The apertures of the metal-wettable filter of step (b) are smaller than the molten salt droplets, which are accordingly prevented by surface tension forces from entering and passing through the filter. The metal-wettable inclusions which do enter the filter have an affinity for the filter material and are retained thereon, in such a way that there is no risk of their being dislodged by a subsequent surge of molten metal.

In step (a), the molten metal is contacted with a molten salt mixture which is capable of wetting and retaining inclusions. The contact should be sufficiently intimate to ensure transfer of inclusions from one phase to the other, and may suitably be turbulent. Contact may be effected by the method of British Patent Specification No. 935191, namely pouring the molten metal into a bath of the molten salt which contains also a spreading device to sub-divide the stream of molten metal. Alternatively, contact may be effected by one of the methods of British Patent Specification No. 1266500, e.g. by passing the molten metal through a perforated refractory screen positioned either within or above the molten salt layer, or by causing the molten metal to flow through a multiplicity of channels lined with molten salt, formed e.g. by a layer of refractory granules coated with the molten salt. Alternatively, the molten salt layer may be filled with refractory shapes designed to assist metal/salt contact without impeding metal flow. Metal-flux contact can also be achieved by use of a mechanical stirring device such as a rotary impellor, a gas dispersing system dependent on introduction of an inert sparging gas, or electro-magnetic stirring, or any combination of thereof. The nature of the molten salt is not critical, and may be conventional. Suitable molten salt mixtures include one or both of KCl and NaCl together with one or more of NaF, sodium and potassium aluminium fluoride, $BaCl_2$ $MgCl_2$ and $CaF_2$.

The surfaces of the filter used in step (b) must be resistant to attack both by the molten metal and by the molten salt, and also must be wetted by the molten metal in preference to the salt. For Al, there are several materials of which the filter may be constructed:

(a) Titanium diboride, other borides such as zirconium diboride and niobium diboride, and other similar substances which are generally known as refractory hard metals.

(b) A composite refractory of alumina and titanium diboride, for example as described in our co-pending British Patent Application No. 8236931 filed on 30th December 1982.

The filter may be formed wholly of such material, or alternatively a coating of such material may be applied to a ceramic base, such as fused alumina, or a strength-providing metal base.

The filter may take a variety of forms such as apertured plates, honeycomb grids, parallel bars, ceramic cloths, ceramic felts, packed beds of correctly sized particles. However, structures of robust construction such as arrays of paralleled bars, and apertured plates, honeycomb grids, or particularly, packed beds are preferred.

The filter is designed to trap and hold metal-wettable inclusions, a function wholly different from anything described in European Patent Specification No. 68782 A2. Since the metal-wetted inclusions have a positive affinity for the filter medium, it is not necessary that the apertures of the filter should be smaller than the inclusions to be filtered. The filter may preferably be formed of a bed of granules of weight average diameter from 0.5 to 6 mm, particularly 1 to 3 mm.

The apertures in the metal-wettable filter are also sized to prevent the passage of molten salt droplets entrained in the molten metal. The size of the molten salt droplets is to some extent dependent on the conditions used in step (a). It is preferred that the metal leaving step (a) does so under rather quiescent conditions, or alternatively that time is allowed for molten salt droplets entrained in the metal leaving step (a) to coalesce into larger drops. It may be necessary to use a filter for step (b) having apertures in which the diameter or minor dimension is as slow as 1 mm or even lower. Preferably, however, the filter will have apertures with a diameter of 2 to 4 mm, or essentially rectangular slits with a minor dimension of about 2 to 3 mm.

The molten salt droplets will not pass through the metal-wettable filter provided that three conditions are met. The filter must be kept filled with metal, and for this purpose it is necessary to maintain a back pressure of metal at the outlet side of the filter; this can be achieved by providing a column of molten metal downstream of the filter by means of an overflow weir in a passage leading e.g. to a casting station. The apertures of the filter must, as indicated above, be not larger than the diameters of the molten salt droplets. The static pressure difference across the filter must not be so great as to overcome the surface tension effects on which operation of the filter are based. The value of the pressure difference (metal or metal salt head) which can be retained on the upstream side of the filter there is substantially in inverse ratio with the diameter of the apertures in the filter. As stated in European Patent Specificatin No. 68782 A2, the value can be calculated from the following formula:

$$h_1 = (1/R_1 G)(2g/r + (R_2 - R_1)Gh_2)$$

where $h_1$ is the height of the molten salt column above the metal overflow weir, $h_2$ is the height of the molten salt column below the weir, $R_1$ is the density of the molten salt, $R_2$ is the density of the molten metal, g is the interfacial tension at the metal/salt interface, r is the radius of the filter apertures, and
G is the gravitational constant.

For a filter aperture of 10 mm diameter, the value of the supportable column of metal or salt is about 20 mm; for a filter aperture of 5 mm diameter, the supportable column is greater than 30 mm. For filters with smaller apertures, the supportable column is correspondingly greater.

The surface area of the filter needs to be sufficiently great to permit the required flow of molten metal without the use of a pressure difference which would force molten salt droplets through. By way of example, a filter of 1 square meter area constituted by a 5 centimeter thick bed of 1 mm diameter particles of $TiB_2$, would permit a metal flow rate of 100 l/min (equivalent to about 240 kg/min of molten Al) with a pressure head drop of 5 cm across the bed. By way of another example, if the openings in the filter were of 2 mm diameter, then it can be calculated that 700 would be required for a flow rate of 500 kg/min, typical of a large casting station. If the distance between centres of each opening was, say, 6 mm, then 700 openings could be fitted on a 16 cm$^2$ plate, and the required metal flow achieved by a pressure difference of 3.5 cm of metal.

If desired, the metal stream may be passed through a conventional filter of metal non-wettable material positioned downstream of the metal-wettable filter. This filter may be designed to catch any small molten salt droplets or any metal non-wettable inclusions that may have passed through the metal-wettable filter. A convenient arrangement is a packed bed of metal-wettable granules (forming the metal-wettable filter) supported on a grid or honeycomb of non-wettable material (forming the non-wettable filter).

Steps (a) and (b) of this embodiment of the method may be carried out in different vessels, but are preferably carried out in the same vessel, conveniently by flowing the molten metal stream downward while in contact with the molten salt mixture, towards a metal wettable filter in the lower part of the vessel. The vessel may have a detachable drop bottom to facilitate removal of spent metal-wettable balls or granules. When a bed of non-wettable shapes is used, this may also conveniently be made removable from the rest of the equipment for renewal. The metal-wettable filter may form part of a baffle separating incoming from out-going metal. The arrangement is preferably such that both the upstream and downstream surfaces of the metal-wettable filter are in contact with substantially only molten metal.

In embodiment (ii) of the method, molten metal is passed in sequence in either order through a filter of metal-wettable material and a filter of metal-non-wettable material.

While applicants do not want to be bound by theory they believe that the metal-wettable filter medium used in this embodiment has an affinity for metal-wetted inclusions, and holds these inclusions securely by surface interaction within the interstices. The wetted interface (filter medium-Al) provides an active surface on to which individual inclusions can agglomerate and grow. Due to this surface locking mechanism, the clustered inclusions will have less chance of being accidentally dislodged from the filter by any subsequent surge of metal flow or other physical disturbance. Similarly, it is believed that the metal-non-wettable filter medium used has an affinity for metal-non-wetted inclusions, and holds these inclusions securely by surface interaction within the interstices.

The material and structure of the filter may be as described above in relation to embodiment (i).

Since the metal-wetted inclusions have a positive affinity for the filter medium, it is not necessary that the apertures of the filter should be smaller than the inclusions to be filtered. Indeed, it will often be desired to filter out metal-wetted inclusions down to a particle size of 15–30 microns or even smaller, and it would not be practicable to use a filter with apertures so small. The minimum size of metal-wetted inclusion retained depends on the aperture of the filter and on the degree of convolution of the passages through it. When the filter is formed of a bed of granules, it is preferred that the weight average diameter of the granules should be from 0.5–6 mm, particularly 1–3 mm. A filter bed of such granules having a depth of at least 50 mm, preferably 100–150 mm should be effective to filter out undesired metal-wettable inclusions. Alternatively, a metal-wettable ceramic felt or blanket of the same thickness and aperture size should have similar properties, but with the advantage that channelling or blockage, which can arise due to relative movement of granules in bed, could not occur.

The material of which the metal-non-wettable filter is made is not critical and may be conventional. Suitable materials for filtering molten aluminium include chromite, corundum, forsterite, magnesia spinel, periclase, silicon carbide and zircon, with tabular alumina (synthetic corundum) being preferred. Also the structure of this filter is not critical. Suitable structures include apertured plates, honeycomb grids, parallel bars, ceramic cloths, ceramic felts and packed beds of regularly or irregularly shaped granules. Preferred are packed beds of granules, which may be uniform but are preferably arranged in layers of different sized particles. Filtering efficiency is determined by the finest particles present, and these should preferably have a weight average diameter of 1.5 to 8 mm, particularly from 2 to 4 mm.

Composite filters may simply comprise superimposed layers of different grades of filter material. A preferred filter comprises a composite upstream layer of granules of metal-non-wettable material, itself including two or more layers of decreasing granule size, followed by a layer of particles of metal-wettable material. If desired, a downstream support layer of granules of metal-non-wettable material may be provided and may itself include two or more layers of increasing granule size. This arrangement has the advantage that the coarsest material is on the outside, so that the layers of finer material, including the metal-wettable material are protected from shock and damage. However, many other arrangements are possible. For example the layer of metal-wettable particles may itself be divided into two or more layers of graded particle size. Or layers of metal-wettable particles may be interposed between the graded layers of metal-non-wettable granules. Or the metal-wettable layer may be positioned upstream of the metal-non-wettable, with a layer of coarse particles on the outside to protect the inner layers from damage.

The thickness of the layers and the total filter area can both be selected in relation to the intended metal flow and pressure difference to provide a filter having desired replacement life and performance characteristics.

When $TiB_2$ and other borides are used as metal-wettable filter media, it is important that they should be kept away from contact with oxygen, otherwise they lose their metal-wetting properties. This is easily done if the method of the invention is operated on a continuous basis. In other cases, it may be necessary to ensure that the filter remains immersed in liquid or solid metal when not in use, or to exclude atmospheric oxygen from the region of the filter. By using an electrically heated filter operating under inert atmosphere (Argon or $N_2$) it is possible to preheat the metal-wettable filter without contact with atmospheric oxygen.

Figure 7:
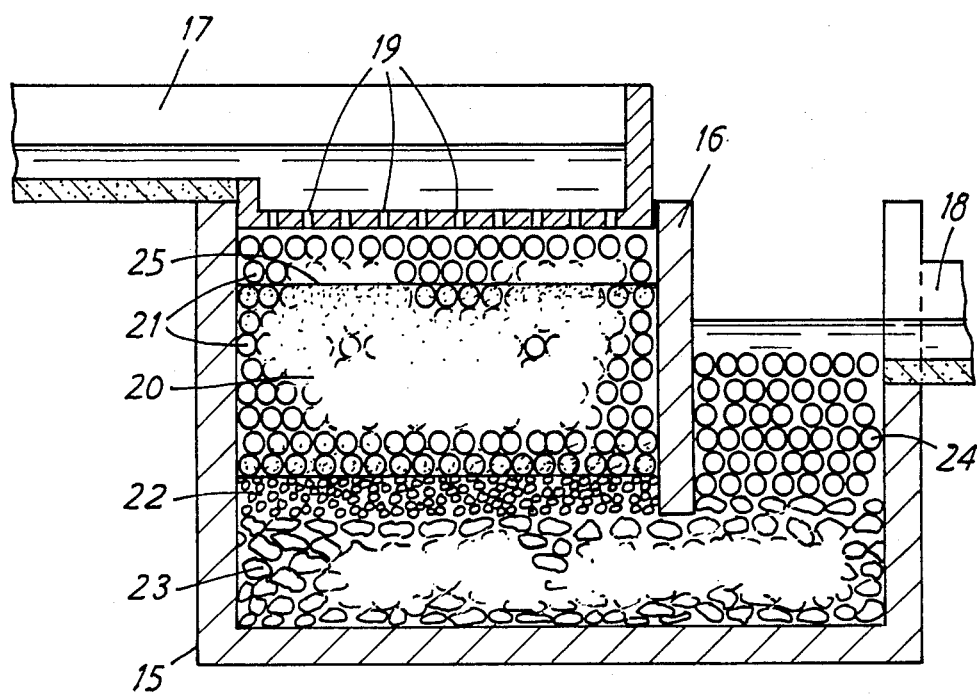
Figure 8:
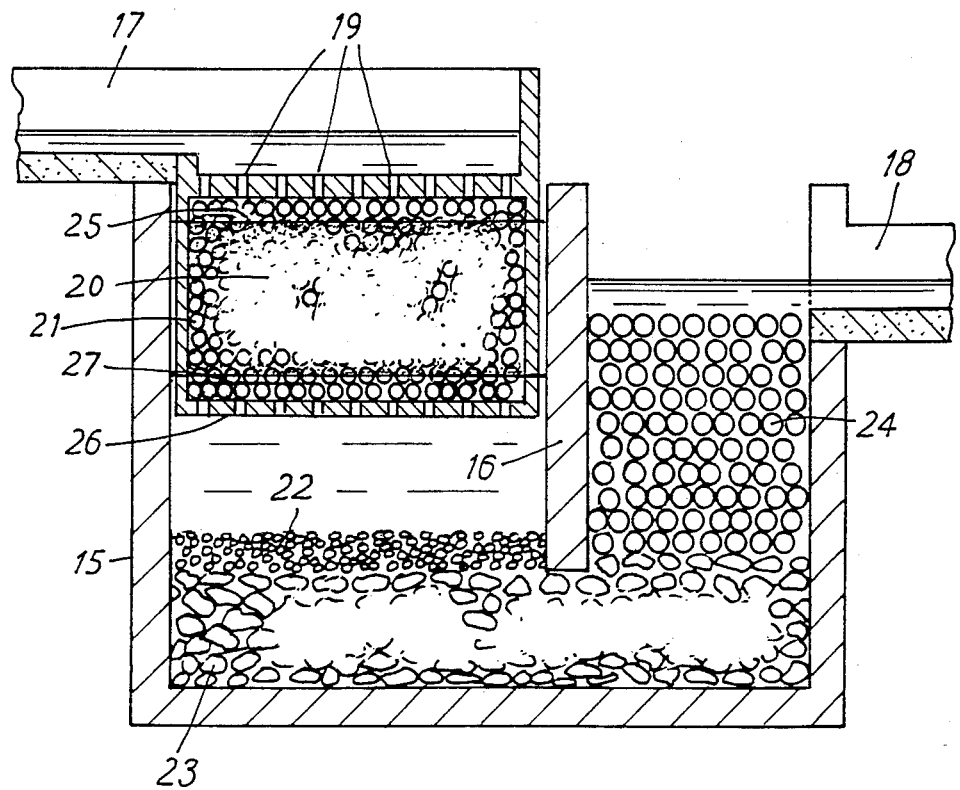
Figure 9:
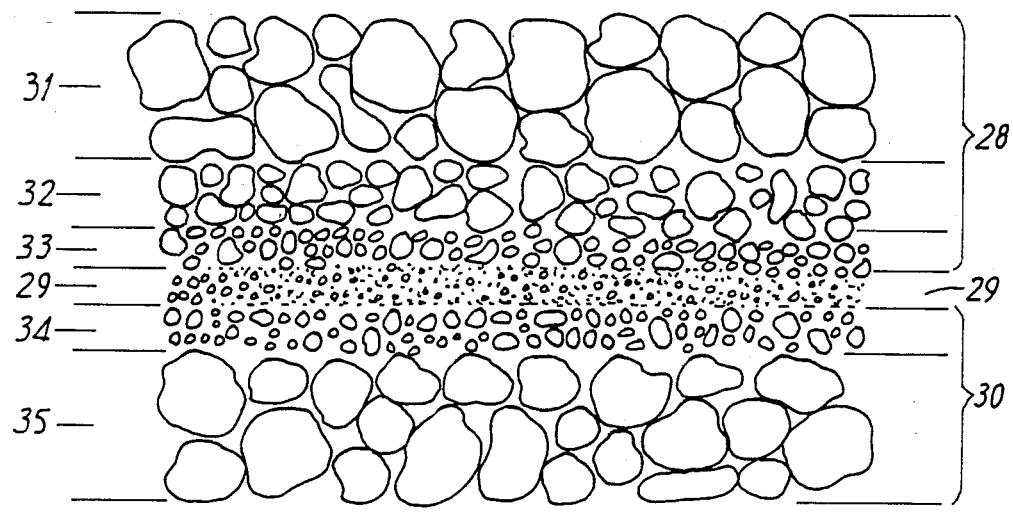

In the accompanying drawings, each of FIGS. 1 to 8 is a diagramatic representation of a different arrangement of equipment for performing the method of embodiment (i) of the invention, and FIG. 9 is a cross-section through a composite filter for use in embodiment (ii).

Referring to FIG. 1, a vessel 1 contains a bath of molten salt 2 in which there is positioned a solid spreading device 3. The molten salt bath overlies a layer of molten metal 7. The vessel is divided into two parts by means of a baffle 4, the lower part of which is constituted by a metal-wettable filter 5. The part of the vessel downstream of the filter is filled with molten metal 8 up to the level of a clean metal exit weir 6.

In operation, a stream of molten metal enters the upstream side of the vessel, impinges against the spreader plate 3, and is broken up into a plurality of streams in intimate contact with the molten salt mixture 2. During this contact, metal non-wettable inclusions are retained by the molten salt, and molten salt droplets become entrained in the molten metal which collects at 7 under rather quiescent conditions to encourage coalescence of molten salt droplets. On passage of the molten metal through the filter 5, molten salt droplets are stopped by surface tension forces and metal-wettable inclusions are retained within the filter. The molten metal is driven through the filter from 7 to 8 by virtue of the difference in the surface levels of the molten salt mixture 2 and of the treated metal 8.

Figure 2:
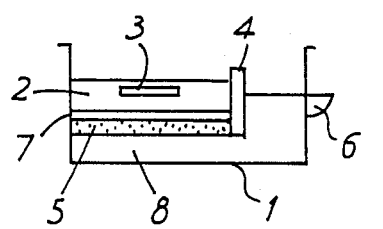

In FIG. 2, the filter 5 is positioned horizontally below the salt layer 2 in the entry compartment and permits a reduction in the height of the treatment vessel 1.

Figure 3:
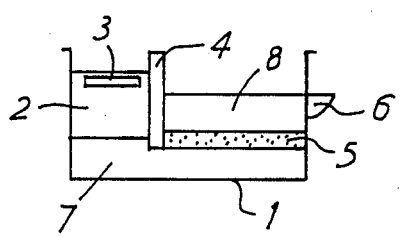

In FIG. 3, the filter 5 is positioned horizontally in the exit compartment and permits a deeper molten salt layer 2 and hence longer metal/salt contact time in step 1.

Figure 4:
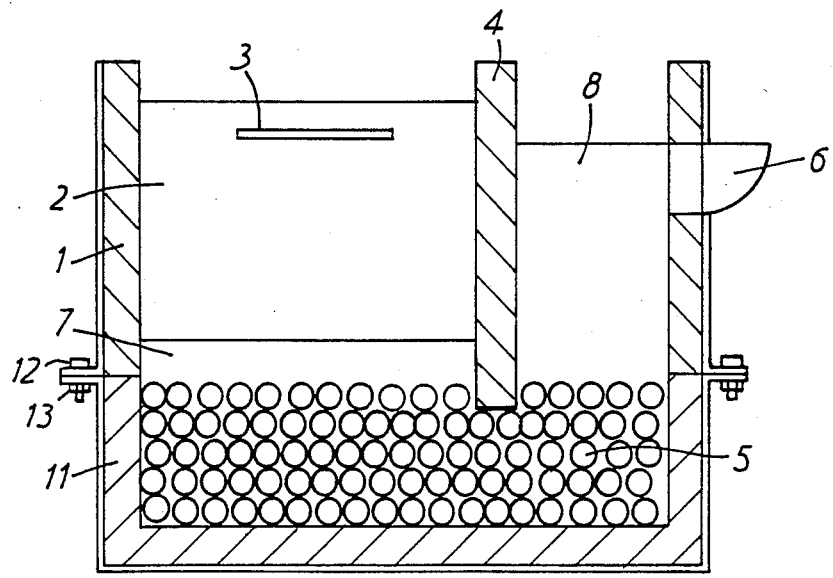

In FIG. 4, the filter 5 comprises a bed of titanium diboride (or other refractory metal boride) balls disposed on the bottom of the vessel 1, such that the top of the bed 5 is above the bottom of the baffle 4. The bottom end 11 of the vessel 1 is detachable from the remainder of the vessel by means of bolts 12 in flanges 13 to facilitate removal of spent $TiB_2$ balls.

Figure 5:
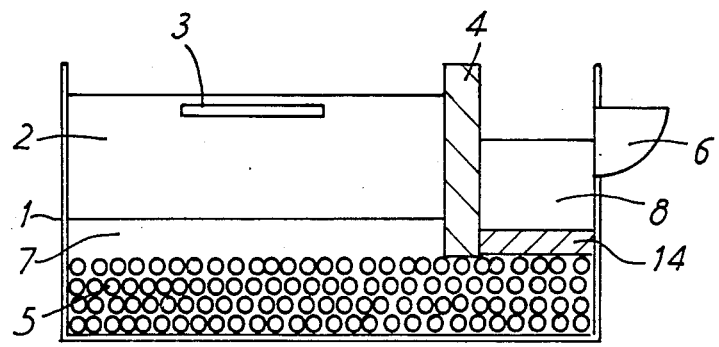

FIG. 5 resembles FIG. 4 except that an alumina honeycomb 14 has been positioned immediately downstream of the $TiB_2$ balls to serve as an additional metal non-wettable filter.

Figure 6:
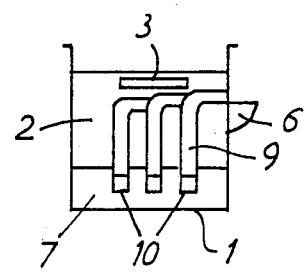

FIG. 6 shows a somewhat different arrangement. A vessel 1 contains a molten salt layer 2, provided with a spreader plate 3, overlying a molten metal layer 7. One or more tubes 9, of a material resistant to molten salt and molten metal, extend from the molten metal layer 7 up through the molten salt layer 2 and across to the side wall of the vessel. The open lower end of the or each tube 9 is closed by a metal-wettable filter 10. Alternatively, the tube or tubes 9 could have been somewhat extended downwards and their lower ends located in a shallow well positioned on the floor of the vessel 1, which well is either lined with or filled with a metal-wettable filter material. Reference is directed to our European Patent Specification 68782 A2 for a fuller description of these and other constructions of metal-wettable filter.

FIG. 7 shows a vessel 15 divided into two parts by a baffle 16 with a metal entry trough 17 to the side of the vessel upstream of the baffle and a metal exit weir 18 from the downstream side. The metal entry trough terminates in a distributor 19 having apertures for passage of molten metal. A molten salt layer 20 is filled with alumina shapes 21 and overlies a layer 22 of fine titanium diboride particles which in turn overlies a layer 23 of coarser titanium diboride shapes. This layer 23 extends beneath the baffle 16 and is overlaid, on the downstream side thereof, by a further bed 24 of alumina shapes. The major part of the vessel is filled with molten metal, the metal/salt interface lying essentially along the boundary between the alumina shapes 21 and the fine titanium diboride shapes 22. The top surface 25 of the salt layer should be maintained a little below the distributor 19.

In operation, molten metal passes through the apertures in the distributor 19 into the molten salt layer 20 where it flows over the alumina shapes 21 at a low velocity with good metal/salt contact and little or no opportunity for salt droplet formation. The metal then flows through the thin layer 22 of fine titanium diboride particles, which aid salt retention without unduly increasing the pressure drop through the bed, through the coarse titanium diboride layer 23, through the alumina bed 24, and finally over the weir 18.

The embodiment of FIG. 8 is similar to that shown in FIG. 7, except that the alumina bed 21 is suspended from the distributor 19, on a perforated plate 26, such that the assembly can readily be removed upwards for renewal of bed material. In operation, the entire molten salt layer 20 is positioned within the bed, the top surface being shown as 25 and the metal/salt interface as 27, and the plate 26 prevents the bed from contacting the metal wettable filter 22/23. The assembly may be formed of grey cast iron or of a suitable refractory material. The cross-sectional area of the assembly is not critical, though the larger is the cross-section the greater is the effective use of the molten salt bath. The assembly may be shaped to conform in the space between the baffle 16 and the outer wall 15 of the treatment vessel. Alternatively, the assembly may comprise simply a circular (or other) cross-section bowl with a solid side wall.

Referring to FIG. 9, a downflow sandwich filter comprises three major layers, an upstream layer 28 of non-wetted alumina, a midstream layer 29 of wetted titanium diboride and a downstream support layer 30 of non-wetted alumina. The upstream layer is itself formed of three layers of granules of progressively increasing fineness, namely a first layer 31 of 8–16 mm diameter granules, a second layer 32 of 4–8 mm diameter granules, and a third layer 33 of 2–4 mm diameter granules. The midstream layer 29 comprises 1–2 mm diameter titanium diboride particles. The downstream support layer is formed of two layers of granules, namely a first layer 34 of 1.5–4 mm diameter granules, and a second layer 35 of 8–16 mm diameter granules.

The thickness of the various layers is chosen in relation to the desired rate of flow of metal per unit area, to provide adequate filtering performance and service life without an excessive pressure drop across the filter. Alternatively, one or more of the layers or indeed all the layers could have been formed of particles or granules of up to twice the specified diameter. Alternatively again, additional layers of titanium diboride particles could have been interpolated between the first and second layers 31, 32, and/or between the second and third layers 32, 33 of the upstream layer 28 of alumina granules.

We claim:

1. A method of removing inclusions from molten metal which method comprises
   (a) providing a stream of molten metal containing inclusions including metal-wettable inclusions, and passing the stream through and in intimate contact with a medium which retains metal-non-wettable inclusions,
   characterized by also
   (b) passing the stream of molten metal through a filter of metal-wettable material which retains metal-wettable inclusions,
   steps (a) and (b) being performed in sequence in either order.

2. A method as claimed in claim 1, wherein the metal is aluminium or an alloy thereof.

3. A method as claimed in claim 2, wherein the metal-wettable material comprises a refractory hard metal.

4. A method as claimed in claim 3, wherein the metal-wettable material is titanium diboride.

5. A method as claimed in claim 1, wherein in step (a) the molten metal is contacted with a molten salt mixture which is capable of wetting and retaining inclusions, and in step (b), which is performed after step (a), the molten metal is passed through a metal-wettable filter having apertures sized to prevent the passage of molten salt droplets.

6. A method as claimed in claim 5, wherein the metal-wettable filter used in step (b) is kept in contact both upstream and downstream with molten metal.

7. A method as claimed in claim 5, wherein after completion of steps (a) and (b) the molten metal is passed through a filter of metal non-wettable material.

8. A method as claimed in claim 5, wherein in step (a) the molten metal is contacted with the molten salt mixture under conditions to ensure that molten salt droplets below a predetermined size do not become entrained in the molten metal, and in step (b) the molten metal is passed through the metal-wettable filter having apertures of radius r not greater than the said predetermined size, and over a metal overflow weir positioned downstream of the filter, the maximum static pressure difference across the filter being expressed by the formula:

$$h_1 = (1/R_1G)(2g/r + (R_2 - R_1)Gh_2).$$

where
   $h_1$ is the height of the molten salt column above the metal overflow weir,
   $h_2$ is the height of the molten salt column bvelow the weir,
   $R_1$ is the density of the molten salt,
   $R_2$ is the density of the molten metal,
   g is the interfacial tension at the metal/salt interface,
   r is the radius of the filter apertures, and
   G is the gravitational constant.

9. A method as claimed in claim 1, wherein in step (a) the molten metal is passed through a filter of metal-non-wettable material.

10. A method as claimed in claim 1, wherein the filter used in step (b) comprises a bed of metal-wettable granules of average diameter 0.5–6 mm.

11. A method as claimed in claim 9, wherein the molten metal is passed through a composite filter comprising at least one layer of metal-non-wettable granules superimposed on at least one layer of metal-wettable particles.

12. A method as claimed in claim 9, wherein the molten metal is passed through a composite filter comprising three upstream layers of metal-non-wettable granules superimposed on a layer of metal-wettable particles having weight average diameters within the ranges:

| Upstream layer of metal-non-wettable granules | (i) 8x to 16x mm |
| --- | --- |
| | (ii) 4x to 8x mm |
| | (iii) 2x to 4x mm |
| Metal-wettable particles where x is from 1 to 2. | 1x to 2x mm |

13. A method as claimed in claim 12, wherein the composite filter also includes two downstream layers of metal-non-wettable granules having weight average diameters in the ranges:

| Downstream layer of metal-non-wettable granules | (i) 1.5x to 4x mm |
| --- | --- |
| | (ii) 8x to 15x mm. |

* * * * *